(No Model.)
C. PARKER.
REIN PROTECTOR.
No. 251,932.
Patented Jan. 3, 1882.
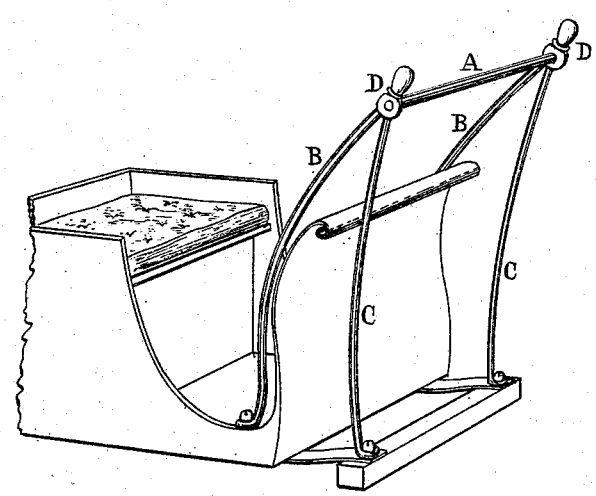
Witnesses:
H.W. Wells,
Rich'd A. Goldsbrough
Inventor,
Charles Parker,
per A. B. Upham.
Attorney in Fact.

UNITED STATES PATENT OFFICE.

CHARLES PARKER, OF WENONA, ILLINOIS.

REIN-PROTECTOR.

SPECIFICATION forming part of Letters Patent No. 251,932, dated January 3, 1882.

Application filed November 5, 1881. (No model.)

*To all whom it may concern:*

Be it known that I, CHARLES PARKER, of Wenona, in the county of Marshall, in the State of Illinois, have invented a Line-Protector; and I do hereby declare that the following is a full, clear, and exact description thereof, reference being had to the annexed drawing, making a part of this specification, in which like letters of reference refer to like parts, and in which the figure represents a perspective view.

The object of this invention is the construction of a protector or guard to be attached to a vehicle that shall prevent the driving-reins from being caught and held by the tail of the horse drawing said vehicle. This result is obtained by the following device:

A is a rod, of either wood or metal, extending a part of or the whole width of the carriage or wagon and held up above and a little in front of the dash-board of said vehicle. The ends of this rod A are fastened by some method admitting of detachability to the bases of the knobs D.

The rods B and C, of wood or metal, are firmly secured at their upper ends to said knobs D, having at other extremities eyes, by which they may be fastened to any convenient parts of the frame-work of the vehicle.

In using this protector the lines rest upon the rod A, and are thereby held at a sufficient height to effectually guard them from being switched under the tail of the animal dragging the vehicle.

The knobs D, which can be highly ornamental, prevent the reins from slipping off sidewise from the rod A. This line-protector also serves to hold an occupant from being thrown over the dash-board by any sudden jolt or stoppage.

What I claim as my invention, and for which I desire Letters Patent, is as follows:

1. The rod A, in combination with the knobs D and rods B and C, substantially as and for the purpose specified.

2. The rod A, having a screw-thread at each end, by which to attach it to the knobs D D, in combination with the rods B B and C C, having eyes at their lower ends, and the said knobs D D fastened to the upper extremities of said rods B B and C C, as and for the purpose specified.

In testimony that I claim the foregoing invention I have hereunto set my hand this 27th day of October, 1881.

CHARLES PARKER.

Witnesses:
H. W. WELLS,
RICHD. A. GOLDSBROUGH.